United States Patent
Soerensen

(10) Patent No.: US 12,553,247 B2
(45) Date of Patent: Feb. 17, 2026

(54) PLATFORM POSITIONING SYSTEM, METHOD OF OPERATING A PLATFORM POSITIONING SYSTEM, AND WIND TURBINE

(71) Applicant: Siemens Gamesa Renewable Energy A/S, Brande (DK)

(72) Inventor: Johnny Soerensen, Videbæk (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 993 days.

(21) Appl. No.: 16/722,107

(22) Filed: Dec. 20, 2019

(65) Prior Publication Data

US 2020/0199894 A1    Jun. 25, 2020

(30) Foreign Application Priority Data

Dec. 21, 2018 (EP) ..................................... 18215286

(51) Int. Cl.
*E04G 3/24*     (2006.01)
*E04G 3/30*     (2006.01)
*F03D 80/80*    (2016.01)
*E04G 3/28*     (2006.01)

(52) U.S. Cl.
CPC .............. *E04G 3/246* (2013.01); *E04G 3/305* (2013.01); *F03D 80/88* (2016.05); *E04G 2003/286* (2013.01)

(58) Field of Classification Search
CPC .......... E04G 1/362; E04G 3/243; E04G 3/246; E04G 3/305; E04G 2003/286; E04G 2003/30; F03D 80/50; F03D 80/55; F03D 80/88; B66B 19/00; B66B 17/34

See application file for complete search history.

(56) References Cited

U.S. PATENT DOCUMENTS 3,402,836 A * 9/1968 Debrey ................ B65G 1/0421
                                                       360/79
3,406,846 A * 10/1968 O'Connor ............ B65G 1/0421
                                                       187/394

(Continued)

FOREIGN PATENT DOCUMENTS

CN    102434404 A    5/2012
CN    102518335 A    6/2012

(Continued)

OTHER PUBLICATIONS

Office Action in related Chinese Patent Application No. 201911327043.X dated Jul. 26, 2021. 17 pages.

(Continued)

*Primary Examiner* — Colleen M Chavchavadze
(74) *Attorney, Agent, or Firm* — Schmeiser, Olsen & Watts LLP

(57) ABSTRACT

Provided is a platform positioning system including a platform and an elevator, wherein a cabin of the elevator is movable along a wall segment of a building, wherein the platform positioning system further includes a first attachment mechanism for releasably attaching the platform to the cabin, wherein the motion of the cabin and the platform are coupled to each other when the platform is attached to the cabin, and a second attachment mechanism for releasably attaching the platform to the wall segment.

16 Claims, 6 Drawing Sheets

(56) References Cited

U.S. PATENT DOCUMENTS

| | | | | |
|---|---|---|---|---|
| 3,533,487 | A | * | 10/1970 | Norin .................... E04G 3/32 |
| | | | | 182/138 |
| 3,593,863 | A | * | 7/1971 | Kintner ............... B66F 9/0755 |
| | | | | 414/273 |
| 3,746,189 | A | * | 7/1973 | Burch .................. B65G 1/0428 |
| | | | | 414/277 |
| 3,955,685 | A | * | 5/1976 | Smith ..................... C21C 5/441 |
| | | | | 182/128 |
| 5,167,299 | A | * | 12/1992 | Nusbaum ............... B66B 5/005 |
| | | | | 182/138 |
| 5,301,770 | A | * | 4/1994 | Regan ...................... E04G 3/30 |
| | | | | 182/128 |
| 5,429,206 | A | * | 7/1995 | Nusbaum ........... E04G 21/3266 |
| | | | | 182/138 |
| 6,305,310 | B1 | * | 10/2001 | Ferri ...................... B63B 27/36 |
| | | | | 182/138 |
| 7,128,521 | B2 | * | 10/2006 | Hansl ........................ B66F 9/07 |
| | | | | 414/807 |
| 9,617,751 | B2 | * | 4/2017 | Jane Panella ........... E04G 21/14 |
| 2002/0104710 | A1 | * | 8/2002 | Thompson .............. E04G 5/001 |
| | | | | 182/138 |
| 2008/0302605 | A1 | * | 12/2008 | St-Germain .............. E04G 5/08 |
| | | | | 182/223 |
| 2011/0308186 | A1 | | 12/2011 | Cortina-Ortega et al. |
| 2013/0174508 | A1 | * | 7/2013 | Reed ...................... E04H 12/08 |
| | | | | 52/655.1 |
| 2013/0202361 | A1 | | 8/2013 | Giering et al. |
| 2013/0233655 | A1 | * | 9/2013 | Peacock ................. B66B 19/00 |
| | | | | 187/414 |
| 2013/0284543 | A1 | * | 10/2013 | De Jong ................. B66B 11/00 |
| | | | | 187/254 |
| 2015/0292263 | A1 | * | 10/2015 | Hierl ....................... E04G 5/007 |
| | | | | 182/128 |
| 2016/0195067 | A1 | * | 7/2016 | Mathiasen .............. F03D 13/20 |
| | | | | 52/745.18 |
| 2017/0113901 | A1 | | 4/2017 | Legua |
| 2018/0238071 | A1 | | 8/2018 | Chase et al. |

FOREIGN PATENT DOCUMENTS

| | | |
|---|---|---|
| CN | 102869836 A | 1/2013 |
| CN | 103303807 A | 9/2013 |
| CN | 203685488 U | 7/2014 |
| CN | 104389747 A | 3/2015 |
| CN | 104743451 A | 7/2015 |
| CN | 205171996 U | 4/2016 |
| CN | 105697242 A | 6/2016 |
| CN | 205802720 U | 12/2016 |
| CN | 206015645 U | 3/2017 |
| CN | 206384699 U | 8/2017 |
| CN | 107269476 A | 10/2017 |
| CN | 107605648 A | 1/2018 |
| CN | 207189946 U | 4/2018 |
| CN | 207229306 U | 4/2018 |
| CN | 207315575 U | 5/2018 |
| CN | 207538549 U | 6/2018 |
| CN | 207538982 U | 6/2018 |
| CN | 108603380 A | 9/2018 |
| CN | 207905991 U | 9/2018 |
| DE | 4224631 A1 | 4/1994 |
| EP | 3032097 A1 | 6/2016 |
| JP | 2008144544 A | 6/2008 |
| WO | 2016162984 A1 | 10/2016 |

OTHER PUBLICATIONS

Huang Junwei, et al. "Development of multi-functional intelligent lift platform based on wind power tower" Lifting and transporting machinery, 2016 (12), pp. 17-19; English Abstract.

European Search Report and Written Opinion of the European Searching Authority issued Apr. 1, 2019 for Application No. 18215286.8, 28 pages.

* cited by examiner

PLATFORM POSITIONING SYSTEM, METHOD OF OPERATING A PLATFORM POSITIONING SYSTEM, AND WIND TURBINE

CROSS-REFERENCE TO RELATED APPLICATIONS

This application claims priority to EP Application No. 18215286, having a filing date of Dec. 21, 2018, the entire contents of which are hereby incorporated by reference.

FIELD OF TECHNOLOGY

The following relates to a platform positioning system comprising a platform and an elevator, wherein a cabin of the elevator is movable along a wall segment of a building. Embodiments of the invention further concern a method for operating such a system and a wind turbine.

BACKGROUND

In buildings, especially in towers of wind turbines, platforms for maintenance and/or access purposes are typically provided in the interior of the building, wherein the platforms are attached to the wall of the building at predetermined positions. Thus, the platforms typically provide a level-like structure within the tower, wherein usually an elevator is used to access the platforms and/or the nacelle. Hence, maintenance work can only be performed on predefined positions, namely at the position where the platforms are located. Additionally, such platform systems are typically rather complex and expensive to produce and to install, and the traditional platform systems have to fulfill relatively high safety requirements.

SUMMARY

An aspect relates to provide an enhanced concept of a platform system allowing more flexibility.

An aspect relates to a platform positioning system as initially described is characterized in that the platform positioning system further comprises a first attachment means for releasably attaching the platform to the cabin, wherein the motion of the cabin and the platform are coupled to each other when the platform is attached to the cabin, and a second attachment means for releasably attaching the platform to the wall segment.

In other words, the platform can be coupled to the cabin by attaching the platform to the outside of the cabin via the first attachment means, wherein the elevator acts as an transportation means for the platform, which, in this case, is not fixed to any wall segment.

The elevator typically comprises the cabin, which can be connected to a driving means, e.g. to an electric motor, e.g. by ropes. The driving means can be located on the top or bottom of the building. Furthermore, the cabin of the elevator can be guided along guiding means, for instance a rail, defining the moving path of the cabin. The guiding means can also serve as or be a ladder, especially a fire ladder or generally a ladder to be used in an emergency. Although the moving track of the cabin is vertical, it is also possible that the moving track can be more complex, e.g. diagonal or even curved. It is also possible that the platform and the cabin are located at least partly on the outside of the building.

If the platform is attached to the cabin, the platform can be moved together with the cabin to a certain, in particular predetermined, position where the platform is required because e.g. maintenance work on the building or on interiors of the building or the like has to be done or the platform is to be provided as an access means, for example to the nacelle. Once the unit consisting of the platform and the cabin has reached this position, the platform is attached to the wall segment via the second attachment means and then detached from the cabin. In this state, the maintenance work and/or access can be performed from the platform and the elevator or the cabin, respectively, can be used as usual, i.e. independently from the platform. If the maintenance is finished, after the cabin has been moved to the platform again, in particular taking a predetermined relative position to the platform, the platform can be attached to the cabin via the first attachment means and can be detached from the wall segment. The platform positioning system is then again in the state where the position of the platform can be changed by moving the cabin of the elevator, respectively.

A plurality of first attachment means and/or second attachment means available at each attachment position along the wall segment is provided to ensure a safe attachment of the platform to the cabin and/or the wall segment.

There can be at least one predefined position along the moving track of the cabin, where the platform can be attached to the wall segment by the second attachment means, in particular providing at least one counterpart for platform-side portions of the second attachment means. A plurality of such positions are provided allowing the platform to be positioned on several locations in or on the building. It is also possible that the platform can be attached at any position along the moving track of the cabin, i.e. that there is an infinite number of positions, where the platform can be attached to the wall segment by the second attachment means, which are thus configured to work without explicit counterpart or interact with a counterpart at least essentially continuously provided on the wall segment. The position where the platform is attached to the wall segment can be chosen with respect to locations where maintenance work is required or access means are to be provided.

Hence, the movable platform according to embodiments of the present invention is configured to replace or complement traditional platform systems comprising one or several permanently installed platforms, which are attached to the wall segment permanently in a fixed position. Instead of several platforms located on a fixed position, the platform according to embodiments of the present invention can be moved along the wall segment and can be brought to the position where the platform is desired. This results in a clear simplification compared to traditional platform systems, since the elevator is used in a synergetic way to act, on the one hand, as a transportation means for the platform and, on the other hand, (as usual for elevators) as a transportation means for staff, tools, work equipment or the like. The platform positioning system may also provide additional flexibility regarding the positioning of platforms and in dimensioning free space along the wall.

Basically, the platform positioning system can be used in buildings like, e.g. chimneys, silos, skyscrapers or the like. In a exemplary embodiment the building is a tower and the platform is a working platform within the tower, wherein the tower is the tower of a wind turbine. The cabin of the elevator, respectively, is typically located within the tower. The wind turbine can comprise a nacelle on top of the tower, which is typically accessible from the ground level directly or indirectly via the elevator. The nacelle can encase electric components of the wind turbine like a generator or the like and a hub for rotor blades is attached to the nacelle. The driving means of the elevator can be located within the nacelle or on the top or the bottom of the tower.

In the case that the building is a tower of a wind turbine, at least one position where the platform can be attached to the wall segment can comprise or be a position where tubular tower segments are attached to each other, since these wall sections are attached to each other typically by flange- or collar-like structures. These structures can be used together with or as a part of the second attachment means to attach the platform to the wall segment. Details concerning this will be described in the following.

In an exemplary embodiment of the invention, the connection provided by the first attachment means and/or the second attachment means is a pin connection. Alternatively, the connection can be a magnetic connection and/or a clamp connection. If the connection provided by the first attachment means and/or the second attachment means is a magnetic connection and/or a clamp connection, it is possible that the platform can not only be attached in discrete positions along the moving track but can be also clamped at any position of, for example, a clamping rail extending along the moving track of the platform or at any position where material for sufficiently strong magnetic interaction is present, respectively. It is noted that wall segments of buildings, in particular towers of wind turbines, may contain magnetic materials which can be suitable for magnetic attachment.

If the connection provided by the first attachment means and/or the second attachment means is a pin connection, the first attachment means and/or the second attachment means can be or can comprise at least one controllably retractable pin, wherein the pin is located at the platform. The pin can be a cylindrical rod or bar made of metal or another suitable material comprising a sufficient mechanical stability. The pin being retractable also means that it is furthermore movable out. The retraction and moving out of the pin happens via a motion of the pin along its longitudinal axis. The controllable in and out movement of the pin may be effected by a corresponding actuator.

The first attachment means and/or the second attachment means can comprise one single pin or a plurality of pins. In an exemplary embodiment a plurality of first attachment means and/or second attachment means is provided. Hence, if in the following the word pin or attachment means is used in singular, it has to be understood in plural as well and vice versa.

The first attachment means and or the second attachment means can be in an attaching state, where the at least one pin is moved out, and in a detaching state, where the at least one pin is retracted. In the attaching state, the first attachment means attaches the platform to the cabin, and in the detaching state, the platform and the cabin are not attached to each other. In analogy to this, in the attaching state, the second attachment means attaches the platform to the wall segment, and in the detaching state, the platform and the wall segment are not attached to each other.

The automatic movement of the pin can be provided by the electromechanical actuator applying a force to the pin leading to a movement of the pin. The electrical power supply of the actuator can be provided by an electrical connection established via the first attachment means and/or the second attachment means. However, since the electrical power supply provided by the second attachment means may lead to the need of a rather complex system of cables to all positions, where the platform can be attached to the wall segment, it is additionally or alternatively possible that the electrical power supply of the actuator is provided by an electrical connection established via the first attachment means. To supply the actuator by electrical power while the platform is attached to the wall segment and not attached to the cabin, or as a general power supply strategy, a storage battery can be provided on the platform. The storage battery can be charged when the platform is attached to the cabin and the electrical connection is established by the first attachment means. For the case that the storage battery is empty (e.g. after the platform has been detached from the cabin for a long time), it can be further possible to move the pins manually.

In addition to the force applied to the pin by the actuator, a restoring force applied to the pin by a component, e.g. by a spring or the like, can be provided forcing the pin into the position where the respective attachment means is in the attaching state. In this embodiment, the actuator can only apply a force to the pin when the respective attachment means has to be brought into or left in the detached state. Thus, if a failure of the platform positioning system occurs, e.g. if the actuator fails, the pin automatically moves out bringing the respective attachment means into the attaching state. Hereby it can be avoided, even if a malfunction of a platform positioning system occurs, that both the first attachment means and the second attachment means are in the detaching state resulting in an accident where the platform falls down.

Additionally, a mechanical pin fastener can be provided holding the pin against the force of the spring retracted, e.g. for avoiding the actuator permanently consuming electric power holding the pin retracted when the platform positioning system is not in operation and the platform is thus in a position, where the respective attachment means or pin has to be in the detached state or retracted permanently.

Although the pins of the first attachment means and/or the second attachment means are assumed to be located at the platform hereafter, it is also possible that the pins are located on the wall segment and/or the cabin of the elevator.

In an exemplary embodiment of the invention, the attachment by the first attachment means and/or the second attachment means is provided by the pin engaging into a blind hole, located on an opposite side with respect to the location of the pin. In the case that the first attachment means comprises the at least one pin located on the platform, the respective blind hole is located on the cabin. The blind hole can be provided directly in the wall of the cabin, but there can also be a component located on the cabin providing the blind hole. The attachment by the respective attachment means is provided by inserting or, in other words, engaging the pin into the blind hole.

Assuming that the second attachment means comprises the at least one pin located at the platform, the respective blind hole is located on the wall segment. The blind hole can be provided directly in the wall segment, or there can be a component attached to the wall segment providing the blind hole, alternatively. There can be several positions on the wall segment along the moving track of the cabin comprising a blind hole each for each pin, wherein each position defines a position where the platform can be attached to the wall segment.

Additionally or alternatively to a blind hole, the attachment can be provided by the pins resting on a respective support section. Assuming the pins or the second attachment means, respectively, are provided on the platform, the support section can be the flange- or collar-like structures where the wall sections of the tower are attached to each other. In this case, the pins move out while it is located slightly above one of the flange- or collar-like structures. Lowering the platform leads the pins and thus the platform to rest on the support area, i.e. on the flange- or collar-like structure and being held there by gravity.

In an exemplary embodiment of the invention, the first attachment means is configured to attach the platform to a lateral section of the cabin, on at least one side wall of the cabin, and/or to a top section and/or a bottom section of the cabin. Assuming that the first attachment means attach the platform to the lateral section of the cabin, the platform is attached to a section at about half height of the cabin. To ensure a stable attachment between the cabin and the platform, the cabin of the elevator can be at least partly surrounded by the platform. In this case, the pin connection provided by the first attachment means is provided by pins on the platform, wherein the respective blind holes are provided at the intermediate section of the wall of the cabin.

In the case that the first attachment means is configured to attach the platform to a bottom section of the cabin, a door of the cabin leads directly onto the platform, assuming the platform is attached to the cabin by the first attachment means. In this embodiment, the first attachment means can be or can comprise pins on the platform, wherein the respective blind holes can be provided at the bottom section, for example the floor plate, of the cabin.

In the case that the first attachment means is configured to attach the platform to a top section of the cabin, the first attachment means can be or can comprise the pins on the platform. The respective blind holes can be provided at the top section, for example the ceiling plate, of the cabin.

The platform comprises an opening through which the cabin is movable, wherein the opening is a through hole or a lateral recess. Without the opening, the range of motion of the cabin of the elevator, respectively, would be limited by the position of the platform. In an extreme case, the cabin cannot move at all, e.g. if the cabin is located above the platform and the platform is positioned at the uppermost position of the tower. To avoid this problem the cabin can move through the through hole and thus the range of motion for the cabin is not limited by the position of the platform. Hence, the elevator can be used without any constraints. The rim of opening may, of course, define where the first attachment means interact to provide attachment of the platform to the cabin.

In this embodiment, it is further possible to allow access to the platform by the cabin of the elevator independently from the current position of the platform. For this purpose, the cabin can move to the upper side of the platform where the staff can than access the platform via the door of the cabin of the elevator.

Seen from above, that is, in a horizontal plane, the opening can be located in the middle of the platform, but also on any other position of the platform. For example, if the cabin moves along directly along the wall segment, the through hole can also be on the side of the platform in form of a lateral recess or the like.

For the case, that the cabin approaches the platform to move through the opening, a warning signal, e.g. a warning light or sound or the like, can be turned on to warn the staff on the platform to be careful while the cabin moves through the opening to avoid accidents. For this purpose, a railing or the like can be provided around the opening.

The platform may comprise further openings, for example for a fire ladder or other components located in the interior of the tower.

In a exemplary embodiment of the invention the platform positioning system comprises a control unit, wherein the control unit is configured to switch the platform positioning system between a first operational state, wherein the platform and the wall segment are disconnected and the platform is attached to the cabin and a second operational state, wherein the platform and the cabin are disconnected and the platform is attached to the wall segment. In other words, the control unit is configured to switch the platform positioning system between the first operational state, where the platform is attached at a fixed position of the wall segment, and the second operational state, where the platform is moved by the elevator. For this purpose, the control unit generates control commands for the first attachment means and for the second attachment means, or the corresponding actuators, respectively. The control unit ensures that the platform is attached to the cabin and/or to the wall segment at any time, or, in other words, that there is no situation where both attachment means are in a detached state leading to the platform falling down. For the case, that the attachment means comprise pins, the control unit ensures, that at any time the pins of the first attachment means and/or the second attachment means are moved out.

The control unit may be configured to switch the platform positioning system between the first operational state and the second operational state with regard to a position information concerning the relative position between the platform and the cabin and/or the wall segment, wherein the position information depends on sensor data measured by a position sensor, wherein the control unit is connected to the position sensor. In other words, the position sensor detects if the relative position between the platform and the cabin of the elevator or the platform and the position on the wall segment, where the platform can be attached, allows engagement of the respective attachment means, in particular if interacting components of the respective attachment means are directly opposed to each other, such that an activation of the first and/or the second attachment means, or their respective actuators, will lead to the respective attachment. In the case of a pin connection as the first attachment means and the second attachment means, the position sensor data measures the relative position between the pin and the blind hole, wherein the pin is not moved out if there is no blind hole opposite to the pin or, in other words, if the platform is not in an attachable position.

An attachment means sensor connected to the control unit can be provided to measure whether an attachment process has been successful to avoid the other attachment means to be detached if this is not the case.

In an embodiment of the invention the control unit can be configured to switch the platform positioning system between the first operational state and the second operational state with regard to an operation information, wherein the operation information depends on a control command generated by a user via an operating device. The control command therefore might trigger a change of the first operational state to the second operational state and vice versa. A typical situation where the user generates a control command triggering the change of the operational state might be, for example, if the user finished the maintenance work at one position and wants to start working at another position within the tower. The user-generated control command may, however, also provide operating information resulting in automatic control of the platform positioning system to reposition the platform. For example, a user may choose a new position along the wall segment for the platform as control command, such that the control unit may control the elevator to position the cabin at the platform, attach the platform to the elevator using the first attachment means, detach the platform at the old, current position, control the elevator to transport the platform to the new position and attach the platform there by correspondingly controlling the second attachment means.

In all cases a detections means surveilling the platform for persons and/or objects may be implemented, such that transport of the platform only takes place if no persons and/or objects are present on the platform. In this case, increased safety is provided. Of course, other conditions may be provided for moving the platform from a current position to the new condition, for example not persons being located below the platform or in the movement area.

In addition, the control unit can be configured to control the operation of the elevator with regard to an elevator information, wherein the elevator information depends on a control command generated by the user via the same or an additional operating device. Thus, the operating device allows the user not only to control whether the platform is attached to the wall segment or the cabin, but also the operation of the elevator.

In a exemplary embodiment, the operating device can be located within the cabin and/or on the platform, and/or it can be provided that the operating device is a remote device, which is wirelessly connected to the control unit. There can be several operating devices provided on several positions of the platform positioning system. For example, a first operating device can be provided on the basement, a second operating device can be provided in the nacelle, a third operating device can be provided on the platform and a fourth operating device can be provided in the cabin of the elevator. In this case, the user can control the operation of the platform positioning system from all these locations. The remote operating device, which is connected to the control unit wirelessly, can be a smartphone with a respective application (app) installed.

In another embodiment of the invention, a safety device, in particular a fence or a net or a plate, is positioned on the bottom side of the platform to catch objects falling down from the platform. This can be relevant especially in the case when there is a gap between the platform and the wall segment or if there are other openings of the platform, through which a person or something else could possibly fall down.

Furthermore, embodiments of the present invention relate to a method for operating a platform positioning system with a platform and an elevator, wherein the transportation of the platform by a cabin of the elevator moving along a wall segment of a building includes the following steps:
  attaching the platform to the cabin by a first attachment means,
  moving the cabin together with the platform to a position where the platform is desired,
  attaching the platform to the wall segment by a second attachment means, and
  disconnecting the platform and the cabin.

Assuming the platform is located in a position in the tower where it is not required at the moment, the cabin can be brought to the position of the platform. Then, the platform is attached to the cabin by the first attachment means and, after this, the second attachment means attaching the platform to the wall segment can be brought into the detached state. In the next step, the cabin, together with the platform, moves to the other position where the platform is desired. In this position, the platform is attached to the wall segment by the second attachment means and finally the first attachment means disconnects the platform and the cabin. If the platform is then required at another position, the method start from the beginning.

In addition, embodiments of the present invention relate to a wind turbine comprising a platform positioning system as described above.

Concerning the installation process of a wind turbine comprising a platform positioning system according to embodiments of the present invention, in a first step, the platform is placed in a flange area if the tower is installed in sections. The flange area is the joint area between two sections of the tower and usually has flange- or collar-like structure. After the tower is installed on the foundation, a person on a rope gets access to the joint area to fasten bolts connecting the tower sections. After this, the nacelle is mounted and secured to the tower, wherein in the bottom of the nacelle, or the top tower section, the wires of the elevator are already pre-installed. In an exemplary alternative, a pre-mounted ladder system used as a guiding track for the elevator can be provided. In a next step, the wires are lowered down, where they are attached and tensioned to the elevator.

In the case of an emergency, a battery powered crane can be used to access the nacelle, wherein the elevator or the cabin, respectively, is controlled to move downwards with a controlled speed without external power.

All features of the platform positioning system according to embodiments of the present invention and the explained advantages also apply to the method and the wind turbine according to embodiments of the present invention.

BRIEF DESCRIPTION

Some of the embodiments will be described in detail, with reference to the following figures, wherein like designations denote like members, wherein.

DETAILED DESCRIPTION

Figure 1:
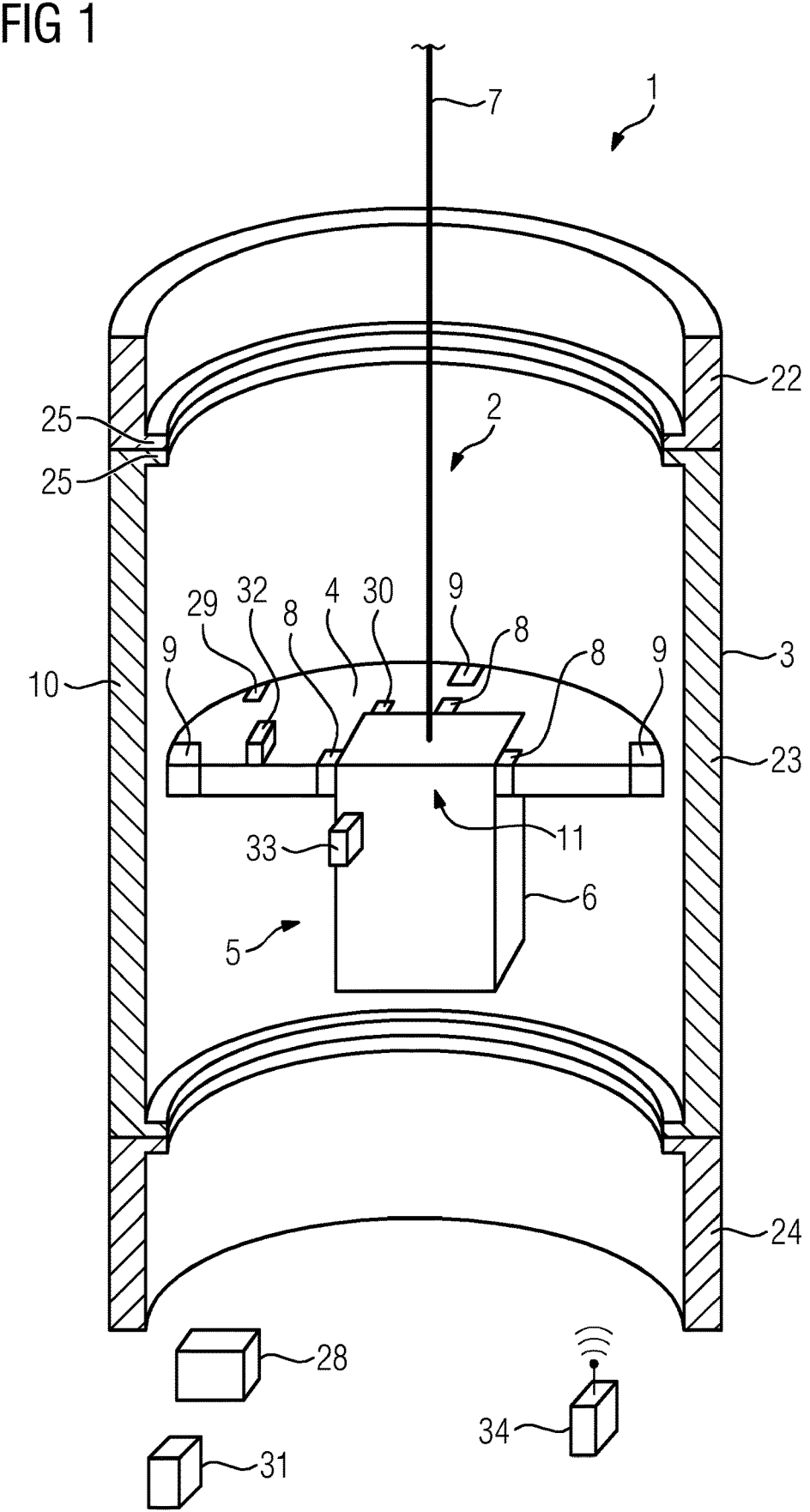
FIG. 1 shows an embodiment of a wind turbine according to the present invention in a first operational state.
Figure 2:
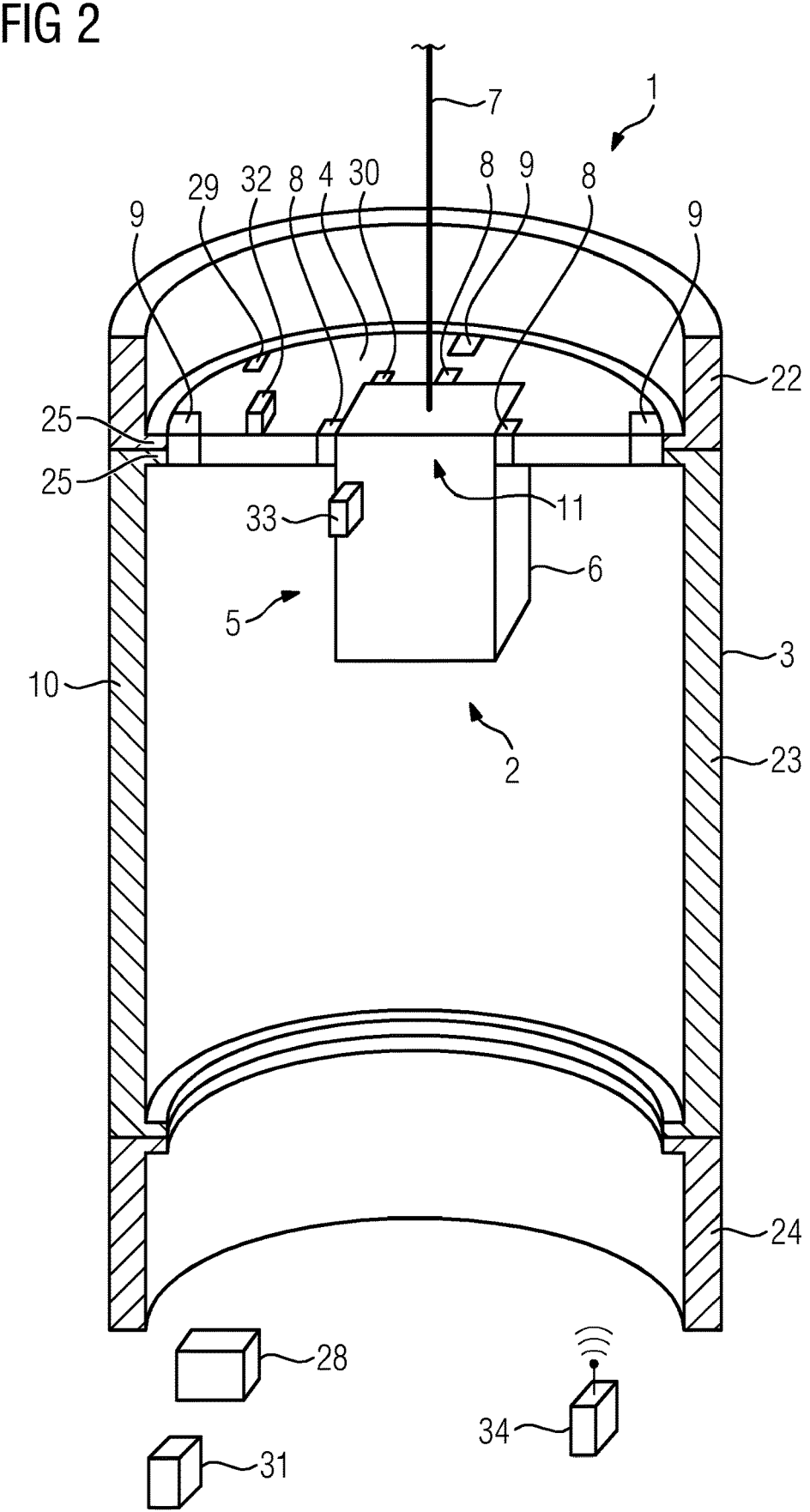
FIG. 2 shows the wind turbine of FIG. 1 in an intermediate operational state.
Figure 3:
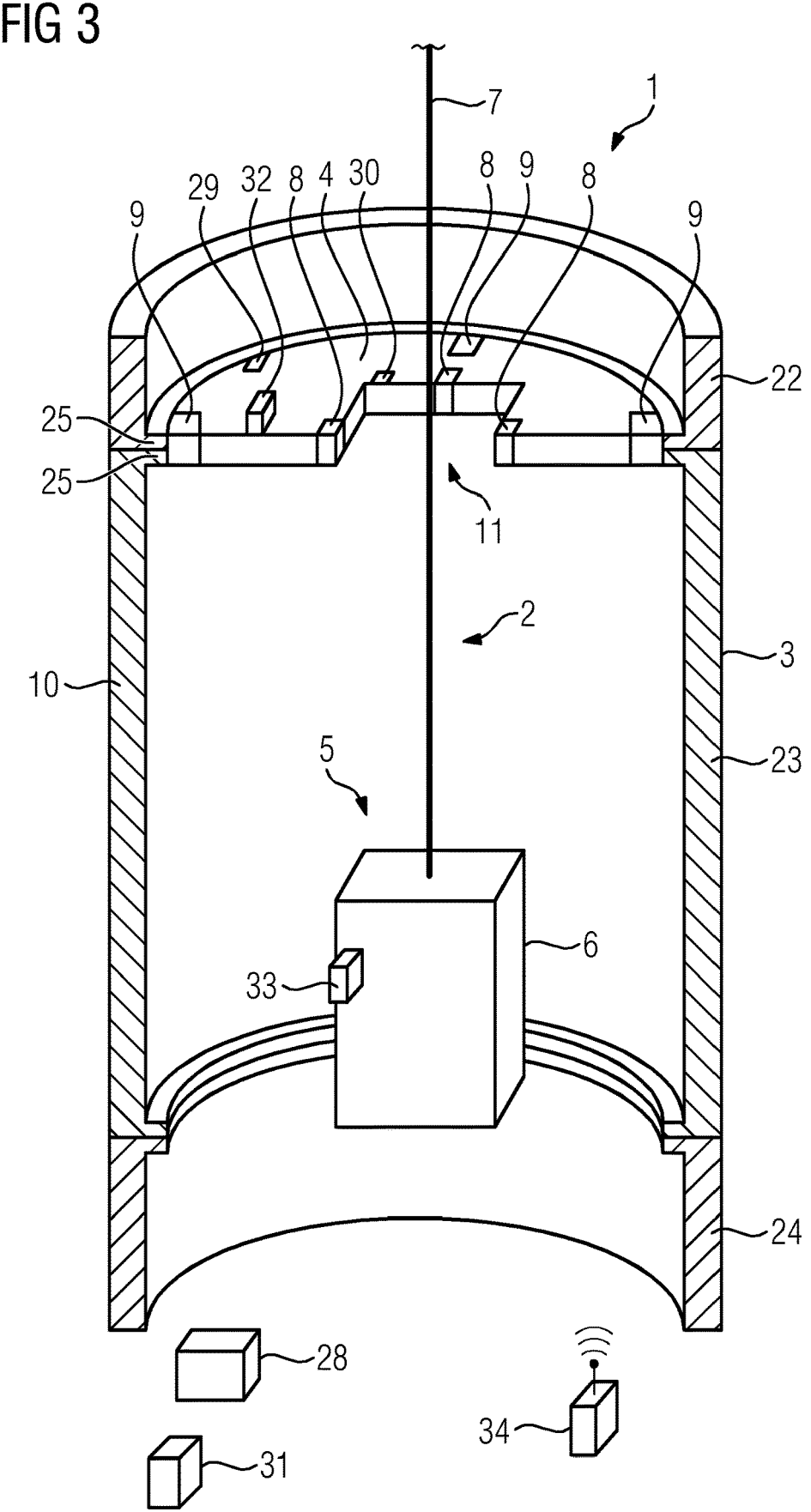
FIG. 3 shows the wind turbine of FIG. 1 in second operational state.

A wind turbine 1 comprises a platform positioning system 2 according to embodiments of the present invention. The platform positioning system 2 is provided within a tower 3 of the wind turbine 1. FIGS. 1, 2 and 3 show a longitudinal sectional view through a section of the tower 3. Although the embodiment shown in FIG. 1 is the wind turbine 1, the platform positioning system 2 basically can also be used in other buildings like chimneys, silos, skyscrapers or the like.

The wind turbine 1 further comprises a nacelle (not shown), which is located on top of the tower 3. Within the nacelle, electric components, e.g. a generator etc., are provided. A hub comprising rotor blades (both also not shown) of the wind turbine 1 is attached to the nacelle.

The platform positioning system 2 comprises a platform 4 and an elevator 5, wherein the elevator 5 comprises a cabin 6, which is connected to an electric motor (not shown) by a rope 7. The electric motor is provided to move the cabin 6 along a vertical direction within the tower 3 of the wind turbine 1. The electric motor is positioned on top of the tower 3 or within the nacelle.

The platform positioning system 2 further comprises four first attachment means 8 for releasably attaching the platform 4 to the cabin 6 and four second attachment means 9 for releasably attaching the platform 4 to a wall segment 10 of the tower 3. The number or the first attachment means 8 and the second attachment means is only exemplary and can differ from four. As shown in FIG. 1, where the platform positioning system 2 is in a first operational state, in which the platform 4 is attached to the cabin 6 of the elevator 5 by the first attachment means 8 and not attached to the wall section 10, the motion of the cabin 6 and the platform 4 are coupled to each other. Hence, the elevator 5 or the cabin 6, respectively, acts as a transportation means for the platform 4.

In a second operational state of the platform positioning system 2, as shown in FIG. 2, the platform 4 is attached to the wall segment 10 by the second attachment means 9 in a position, where work, e.g. for maintenance concerning the tower 3 or the interior of the tower 3, has to be done. In addition, in the second operational state of the platform positioning system 2 the platform 4 is not attached to the cabin 6. In the second operational state, staff can be on the platform 4 to perform the maintenance work or for other purposes. Since the platform 4 is typically not attached to the cabin 6 while it is attached to the wall section 10, the elevator 5 can be used independently from the position of the platform 4 in this operational state, in particular to transport staff and/or equipment to the platform 4 or other places inside the tower 3.

In contrast to traditional platform systems, where several non-portable platforms are attached to the wall segment 10 within the tower, the platform 4 of the wind turbine 1 can be moved together with the cabin 6 to a position where the platform 4 is required for, e.g. maintenance work or the like. Maintenance work can thus be performed not only on pre-defined positions, where permanently installed platforms would be installed, and/or without using additional climbing equipment, but can be basically performed at any position where the platform 4 can be attached to the wall segment 10 by the second attachment means 9. Thus, the platform positioning system 2 is much simpler and more flexible compared to traditional platform systems, especially with respect to the simplification of maintenance work.

FIG. 3 shows an intermediate operational state regarding the first and the second operational state, where the platform 4 is attached to the cabin 6 by the first attachment means 8 and to the wall segment 10 by the second attachment means 9. Details regarding the situation shown in FIG. 3 will be described later.

Figure 4:
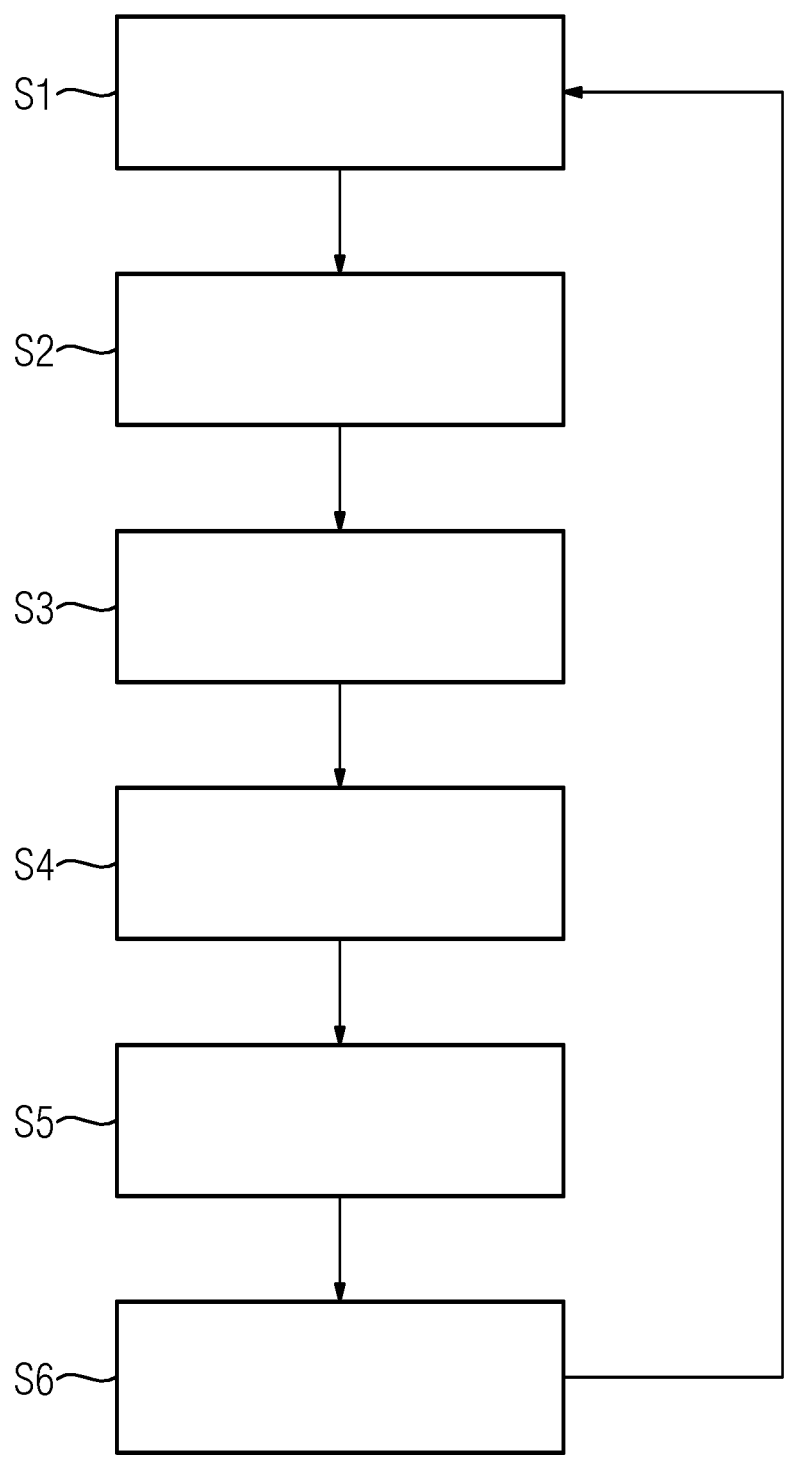
FIG. 4 shows a flow chart of a method according to the present invention.

FIG. 4 shows a flow diagram of a basic method for operating the platform positioning system 2. In a first step S1, the cabin 6 is moved to the platform 4. In other words, in step S1 the platform 4 and the cabin 6 are brought into a relative position to each other, in which they can be attached by the first attachment means 8. In a step S2, the platform gets attached to the cabin 6 by the first attachment means 8 and, after this has been successfully completed, detached from the wall segment 10 by the second attachment means 9. In a third step S3, as shown in FIG. 1, the platform 4 moves together with the cabin 6 to a position where the platform 4 is desired. After the platform 4 and the cabin 6 have reached this position, the platform 4 is attached to the wall segment 10 by the second attachment means 9 in a step S4. In the next step S5, the platform 4 is disconnected from the cabin 6 by detaching the first attachment means 8. FIG. 2 shows the situation of the platform positioning system 2 while the steps S4 and S5 are executed. After step S5 has finished, in a step S6 the elevator 5 can be operated independently from the position of the platform 4 as shown in FIG. 3. As soon as the platform 4 is required in another position, the method starts again with step S1.

Figure 5:
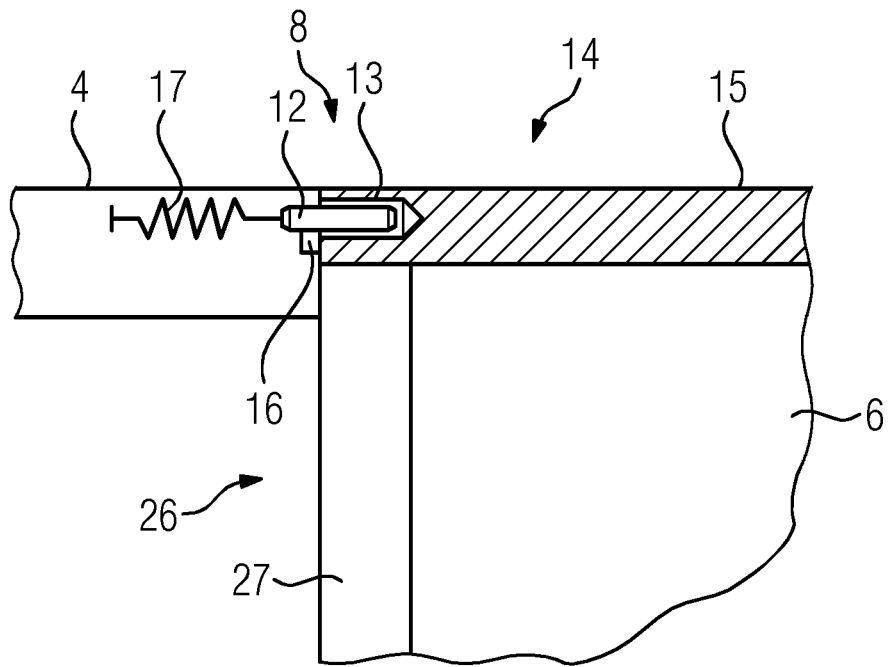
FIG. 5 shows a detailed view of a section of the first attachment means in the wind turbine of FIG. 1.
Figure 6:
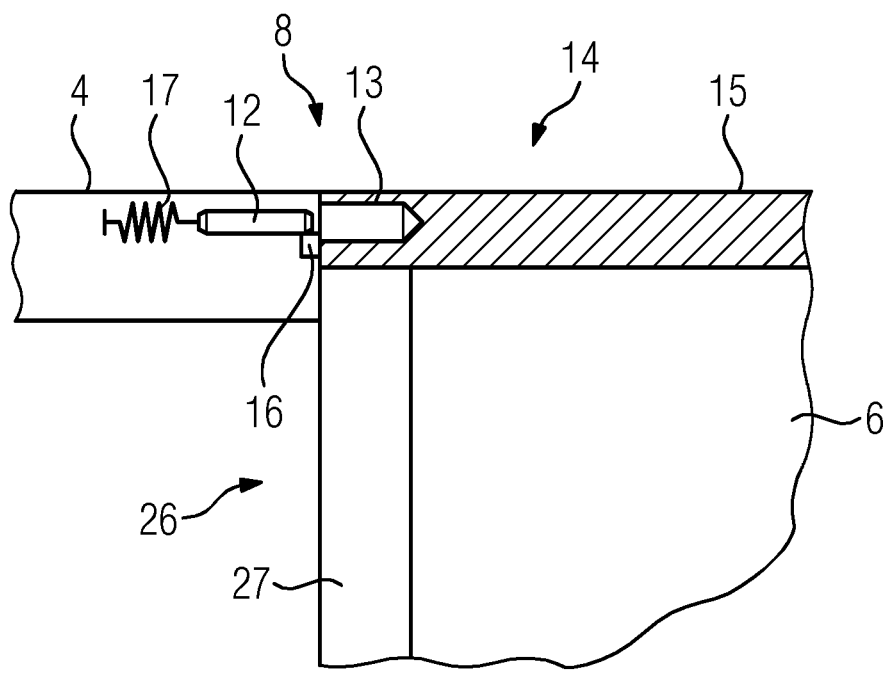
FIG. 6 shows the detailed view of FIG. 5 of the first attachment means being in another state.

Next, the first attachment means 8 will be described in more detail. The first attachment means 8 are positioned on the edge of a rectangular opening 11 of the platform 4. An enlarged view of the left-side first attachment means 8 of FIG. 1 is shown in FIGS. 5 and 6. In the present embodiment, the first attachment means 8 is exemplarily a pin 12 which is located at the platform 4. The pin 12 is a cylindrical rod or bar made of metal, wherein the pin 12 is automatically retractable. The motion of the pin 12, i.e. the retraction and the moving out, happens along the longitudinal axis of the pin 12.

The first attachment means 8 can be in an attaching state (FIG. 5), wherein the pin 12 is moved out, and in a detaching state (FIG. 6), wherein the pin 12 is retracted. In the attaching state, the pin 12 attaches the platform 4 to the cabin 6 meaning that the platform positioning system 2 can be operated in the first operational state.

The attachment provided by the first attachment means 8 is provided by the pin 12 inserted into a blind hole 13 within a top section 14, in particular within a ceiling panel 15 of the cabin 6. Alternatively, a separate component comprising the blind hole 13 can be attached to the cabin 6. The insertation of the pin 12 into the blind hole 13 blocks a vertical motion of the platform 4 with respect to the cabin 6, i.e. the vertical motions of the platform 4 and the cabin 6 are coupled to each other.

In the detaching state as shown in FIG. 6, wherein the platform positioning system 2 can be operated in the second operational state, the platform 4 and the cabin 6 are not attached. In this state, the pin 12 is retracted allowing the cabin 5 to move vertically independently from the platform 4.

An automatic movement of the pin 12 is provided by an electromechanical actuator 16 applying a force to the pin 12 leading to the respective movement of the pin 12. Although basically the electrical power supply of the actuator 16 can be provided by an electrical connection established via the first attachment 8 and the second attachment means 9, it is provided only by an electrical connection established via the first attachment means 8, since the electrical power supply provided by the second attachment means 9 would lead to the need of a rather complex system of cables to all positions, where the platform 4 can be attached to the wall segment 10. To supply the actuator 16 by electrical power while the platform positioning system 2 is in the second operational state, a storage battery (not shown), which can be charged when the platform 4 is attached to the cabin 6, can be provided on the platform 4.

Exemplarily, a spring 17 is connected to the pin 12 on its one side and on the platform 7 on its other side. Thus, the spring 17 applies a force to the pin 12 leading the pin 12 to move into the position where it is moved out, i.e. the spring 17 forces the first attachment means 8 into the attaching state. Therefore, the force applied by the actuator 16 to the pin 12 has to be greater than the force applied by the spring 17 to bring the first attachment means 8 into the detaching state. If a failure of the platform positioning system 2 occurs, e.g. leading to a malfunction of the actuator 16, the spring 17 automatically brings the first attachment means 8 into the attaching state. This ensures that, even if a failure of the platform positioning system 2 occurs, the platform 4 cannot be detached from the cabin 6 leading to an accident where, in the worst case, the platform 4 falls down.

To avoid the actuator 16 permanently consuming electric power holding the pin 12 retracted when the platform positioning system 2 is not in operation and the platform 4 might be in a position, where the first attachment means 8 or pin 12 has to be in the detached state or retracted permanently, a mechanical pin fastener (not shown) is provided holding the pin 12 against the force of the spring 17 retracted.

Although in the embodiment the platform 4 is attached to the top section 14 of the cabin 6, the platform 4 can alternatively be attached to the cabin 6 on a lateral section 26, which is a side wall 27 of the cabin 6, or to a bottom section, e.g. a floor panel of the cabin 6. In all these embodiments, either blind holes directly at these components or separate components with blind holes, which are attached to the top section 14, to the lateral section 26 and/or to the bottom section, can be used to interact with the first attachment means 8. An advantage of attaching the cabin 6 to the bottom section of the cabin 6 is, that, if the platform positioning system 2 is in the first operational state, where the platform 4 is attached to the cabin 6, the platform 4 can be accessed from the cabin 6 quite easily just by opening a door (not shown) of the cabin 6.

Figure 7:
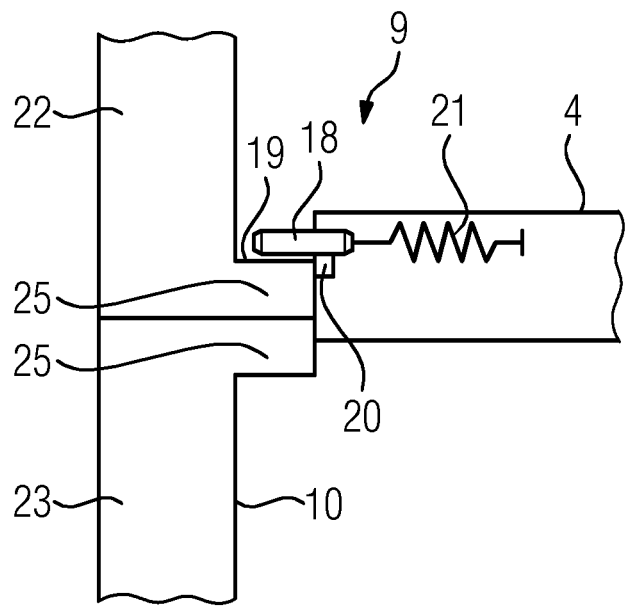
FIG. 7 shows a detailed view of a section of the second attachment means the wind turbine of FIG. 3.
Figure 8:
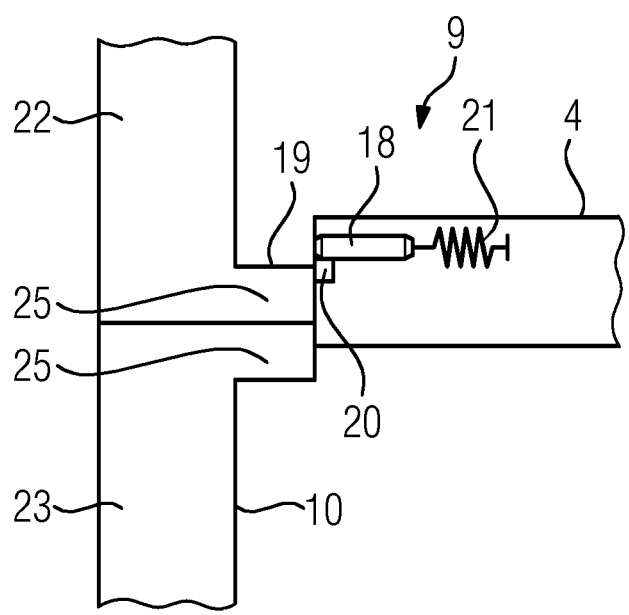
FIG. 8 shows the detailed view of FIG. 7 of the second attachment means being in another state.

Next, the second attachment means 9 will be described in more detail. The second attachment means 9 are located on the outer rim of the disk-shaped platform 4 and are distributed equally around the circumference of the platform 4. An enlarged view of the left second attachment means 9 of FIG. 3 is shown in FIGS. 7 and 8. Exemplarily, the second attachment means 9 comprises a pin 18 which is located at the platform 4. The pin 18 is, like the pin 12, a cylindrical rod or bar made of metal, wherein the pin 18 is automatically retractable.

Like the first attachment means 8, the second attachment means 9 can be in an attaching state (FIG. 7), where the pin 18 is moved out, and in a detaching state (FIG. 8) where the pin 18 is retracted. In the attaching state, the pin 18 attaches the platform 4 to the wall segment 10, meaning that the platform positioning system 2 can be operated in the second operational state. The attachment provided by the second attachment means 9 by the pin 18 differs from the attachment provided by the first attachment means 8 in this embodiment. Instead of getting inserted into a blind hole, the pin 18 rests on a support section 19 of the wall segment 10. The resting of the pin 18 on the support section 19 blocks a vertical motion of the platform 4 with respect to the wall segment 10, i.e. the platform 4 cannot fall down if the pins 18 are moved out.

An electromechanical actuator 20 and a spring 21 is also provided for the second attachment means 9 based on the same principles and fulfilling the same function as the electromechanical actuator 16 and the spring 17 of the first attachment means 8.

Next, the support section 19 will be described in greater detail. Although basically also a component attached to the wall segment 10, optionally with a blind hole or just a horizontal area to interact with the pin 18, would be suitable for this purpose, here a constructional feature of the tower 3 of the wind turbine 1 is used. The tower comprises several tubular tower segments 22, 23, 24. Two adjacent tower segments 22, 23, 24 are attached to each other on flange- or collar-like structures 25 at their axial ends by fasteners (not shown) like bolts with nuts or the like. Since the radial cross section of the tower is reduced in the area of the flange- or collar-like structures 25, the upper areas of the flange- or collar-like structures 25 are used as the support section 19 providing pre-defined positions, where the platform 4 can be attached to the wall section 10. Hence, no further components are required to provide the attachment of the platform 4 and the wall section 10 by the pin 18. Although in FIGS. 1, 2, 3 the tower 3 consists only of three tubular tower segments 22, 23, 24, the number of tubular tower sections can of course differ from three.

In this embodiment, the platform 4 can be attached to the wall section 10 in all positions where two of the tower sections 22, 23, 24 abut on each other. For this purpose, the platform 4 can be moved to a position right above the flange- or collar-like structures 25 by the cabin 5 while the first attachment means 8 attach the platform 4 to the cabin 5. The pins 18 of the second attachment means 8 can be moved out and the platform 4 can be lowered leaving the pins 18 and thus the platform 4 resting on the flange- or collar-like structure 25. To provide more positions where the platform 4 can be attached to the wall section 10, further components attached to the wall segment 10, optionally with a blind hole or a horizontal area to interact with the pin 18, can be attached to the wall section 10.

Alternatively, a blind hole rail comprising a plurality of blind holes with a distance of, for example, 1 meter to each other can be provided in the tower 3 extending along the longitudinal axis of the tower 3 to provide a plurality of pre-defined positions along the wall segment 10, where the platform 4 can be attached.

Even though, in the embodiment described above, the attachment provided by the first attachment means 8 and the second attachment means 9 is based on pins 12, 18, these connections could alternatively or additionally provided by magnetic and/or clamp connections. In this case, a rail or the like extending along the longitudinal axis of the tower 3 can be used to interact with the second attachment means 9 leading to the advantage that the platform 4 can be attached to the wall section 10 via the rail on any desired position along the rail.

Another optional aspect of embodiments of the present invention concern the opening 11 of the platform, which is a through hole. The radial cross section of the opening 11 matches the cross section of the cabin 6 allowing the cabin 6 to pass through the opening 11, when the platform 4 is not attached to the cabin 6. This allows the elevator 5 to be operated completely independently of the position of the platform 4. If the cabin 6 is located at a position beneath the platform 4, the rope 7 passes through the opening 11. Assuming a person wants to get into the nacelle of the wind turbine 1 starting from the ground level, the person can enter the cabin 6 of the elevator 5 at the ground level, the cabin 6 can then be lifted upwards, passing through the opening 11 of the platform 4 (which is, in this case in the second operational state, i.e. attached to the wall segment 10), and finally reaching the nacelle. Similar to this, the platform 4 can be reached by the cabin 6. To this end, the cabin 6 can be moved to a position in which the floor of the cabin 6 is leveled with the top of the platform 4. Notwithstanding all these aspects, basically the cabin 6 can be used to transport people or the like also in the first operational state, where the platform 4 is attached to the cabin 6.

In the present embodiment, the opening 11 is located in the middle of the platform 4. However the opening 11 or additional openings can be also provided on any other position in the platform 4, depending on the horizontal position of the cabin 6 of the elevator 5 within the tower 3. For instance, if the cabin 6 is guided directly along the wall section 10 (e.g. along a guiding means like a rail or a ladder or the like), the opening 11 can also be on the side of the platform 4 in form of a lateral recess or the like. In this case, the cabin 6 is only partly surrounded by the platform 4.

In the case that the cabin 6 approaches the platform 4 to move through the opening 11, a warning signal or a warning light or the like is provided as a safety precaution to warn the staff on the platform 4 to be careful while the cabin 6 moves through the opening 11 to avoid accidents.

Since typically further access means like vertical ladders or other components inside the tower 3 can be provided, the platform 4 might also comprise further openings for passing through these further access means or other components.

A control unit 28 is provided switching the platform positioning system 2 from the first operational state into the second operational state and vice versa. The control unit 28 is connected to the actuators 16, 20 and generates control signals therefor. The control unit 28 is configured to ensure that the platform 4 is attached to the cabin 6 and/or to the wall segment 10 at any time, or, in other words, that there is no situation where the first attachment means 8 and the second attachment means 9 are in the detached state, causing the platform 4 to fall down. For clarity, the connection means connecting the control unit 28 to the respective components are not shown in the figures.

The control unit 28 is configured to switch the platform positioning system 2 between the first operational state and the second operational state while considering sensor data measured by a position sensors 29, 30. The position sensor 29 is located at the platform 4 (but can be basically also located somewhere else, e.g. on the flange- or collar-like structure 25 and/or the cabin 6). The position sensor 29 measures the relative position between the flange- or collar-like structure 25 and the platform 4. The position sensor 29 measures the relative position between cabin 6 and the platform 4. Using the position data measured by the position sensors 29, 30, the control unit 28 can generate the control signals for the actuators 16, 20 at a time when the platform 4 and the cabin 6 or the flange- or collar-like structure 25, respectively, are at a relative position to each other such that moving the pins 12, 18 out will establish the required attachment.

The control unit 28 can be connected to attachment means sensors (not shown), which are measuring in which state the pins 12, 18 are at the moment. Alternatively, the control unit 28 can obtain information about the current state of the pins 12, 18 just by analysing previous control signals concerning the actuators 16, 20 and/or feedback from these actuators.

The control unit 28 is configured to switch the platform positioning system 2 between the first operational state and the second operational state with respect to a control command generated by a user via an operating device 31, 32, 33, 34. In other words, the control command may directly or indirectly trigger a change of the current operational state of the platform positioning system 2. This can be desired if the user has finished the maintenance work, wherein the platform 4 is attached to a certain position of the wall segment 10, and wants to use the cabin 6 to bring the platform 4 to another position of the wall segment 10.

In the present embodiment, a plurality of operating devices 31, 32, 33, 34 is provided. A first operating device 31 is provided on the basement of the tower 3, a second operating device (not shown) is provided in the nacelle, a third operating device 32 is provided on the platform 4 and a fourth operating device 33 is provided within the cabin 6.

A remote operating device 34, e.g. a smartphone with a respective application installed or an infrared remote control, is connected to the control unit 28 wirelessly.

In addition, the control unit 28 is configured to control the operation of the elevator 5 depending on a control command generated by the user via the operating device 31, 32, 33, 34. Thus, the operating device 31, 32, 33, 34 allows the user not only to control whether the platform 4 is attached to the wall segment 10 or the cabin 6, but also the operation of the elevator 5.

Additionally, operating information resulting in an automatic control of the platform positioning system 2 to reposition the platform 4 can be provided by the user-generated control command. Assuming the platform 4 is desired at another position on the wall segment 10, the user can generate a control command regarding to the other position as a new position. Hence, the control unit 28 may control the elevator 5 to position the cabin 6 at the platform 4, attach the platform 4 to the cabin 6 using the first attachment means 8, detach the platform 4 at the old, current position on the wall segment 10, control the elevator 5 to transport the platform 4 to the new position and attach the platform 4 there by correspondingly controlling the second attachment means 9.

Optionally, the platform 4 comprises several safety appliances (not shown). Firstly, a safety device, in particular a fence, a net, a plate or the like, is provided on the bottom side of the platform to catch objects, e.g. persons or tools or other objects, falling down from the platform 4. Secondly, railings (not shown) are provided around the opening 11 and at the rim of platform 4.

Another safety appliances of the platform positioning system 2 is a detections means (not shown) surveilling the platform 4 for persons and/or objects, such that transport of the platform 4 only takes place if no persons and/or objects are present on the platform 4. Furthermore, other conditions may be provided for moving the platform from a current position to the new condition, for example no persons being located below the platform or in the movement area.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A platform positioning system comprising:
   a platform;
   a plurality of tubular tower segments, wherein two adjacent tubular tower segments are attached to each other on flanges at axial ends of the tubular tower sections, the flanges extending radially inwardly;
   an elevator comprising a cabin having a hole on at least one side wall, and/or a top section and/or a bottom section of the cabin, wherein the cabin of the elevator is movable along a wall segment of a building formed by the plurality of tubular tower segments;
   a first attachment means configured to be inserted into the hole of the cabin for releasably attaching the platform to the cabin, wherein a motion of the cabin and the platform are coupled to each other when the platform is attached to the cabin; and
   a second attachment means configured to rest on a support section of the flanges for releasably attaching the platform to the wall segment;

wherein the platform comprises an opening that allows the cabin to completely pass through the opening such that a range of motion of the cabin is not limited by a position of the platform; and a control unit configured to switch the platform positioning system between a first operational state wherein the platform and the wall segment are disconnected, and the platform is attached to the cabin by the first attachment means being inserted into the hole of the cabin, and a second operational state, wherein the platform and the cabin are disconnected and the platform is attached to the wall segment by the second attachment means resting on the support section of the flanges;

wherein, in the second operational state when the cabin is disconnected from the platform, the platform is attached to the wall segment and supported at a position within the building based on the second attachment means.

2. The platform positioning system according to claim 1, wherein the building is a wind turbine and the platform is a working platform located within the wind turbine.

3. The platform positioning system according to claim 1, wherein a connection provided by the first attachment means and/or the second attachment means is a pin connection.

4. The platform positioning system according to claim 3, wherein the first attachment means and/or the second attachment means comprises an automatically retractable pin, wherein the automatically retractable pin is located at the platform.

5. The platform positioning system according to claim 1, wherein the opening is a through hole or a lateral recess.

6. The platform positioning system according to claim 1, wherein the control unit is configured to switch the platform positioning system between the first operational state and the second operational state with regard to a position information concerning the relative position between the platform and the cabin and/or the wall segment, wherein the position information depends on sensor data measured by a position sensor, further wherein the control unit is connected to the position sensor.

7. The platform positioning system according to claim 1, wherein the control unit is configured to switch the platform positioning system between the first operational state and the second operational state with regard to an operation information, further wherein the operation information depends on a control command generated by a user via an operating device.

8. The platform positioning system according to claim 7, wherein the control unit is configured to control the operation of the elevator with regard to an elevator information, further wherein the elevator information depends on a control command generated by the user via the operating device.

9. The platform positioning system according to claim 7, wherein the operating device is located within the cabin and/or on the platform and/or that the operating device is a remote device, which is wirelessly connected to the control unit.

10. The platform positioning system according to claim 1, wherein, when the cabin is disconnected from the platform, the platform is supported at the position within the building only at outer edges of the platform via the second attachment means connected to the wall segment.

11. The platform positioning system according to claim 1, wherein, in the first operational state when the cabin is connected to the platform, the cabin and the platform are both supported within the building by a rope connected at one end to the cabin and at another end to an electric motor disposed at a top of the building.

12. The platform positioning system according to claim 1, wherein, when the cabin is located above the platform, the rope is above the platform, and when the cabin is located beneath the platform, the rope passes through the opening and extends beneath the platform.

13. The platform positioning system according to claim 1, wherein an automatic movement of the first attachment means is provided by an electromechanical actuator applying a force to the first attachment means leading to a respective movement of the first attachment means, and a spring is connected to the first attachment means on one side and on the platform on an other side, the spring applying a force to the first attachment means leading the first attachment means to move into the hole of the cabin, further wherein, when the force applied by the actuator to the first attachment means is greater than the force applied by the spring, the first attachment means is brought into the second operational state and the first attachment means is no longer within the hole of the cabin.

14. The platform positioning system of claim 13, wherein, in response to a malfunction of the actuator, the spring automatically brings the first attachment means into the first operational state, ensuring that the platform cannot be detached from the cabin.

15. A wind turbine comprising the platform position system according to claim 1.

16. A method for operating a platform position system with a platform and an elevator, the platform positioning system comprising a plurality of tubular tower segments, wherein two adjacent tubular tower segments are attached to each other on flanges at axial ends of the tubular tower sections, the flanges extending radially inwardly, the elevator comprising a cabin having a hole on at least one side wall of the cabin, and/or a top section and/or a bottom section of the cabin, wherein a transportation of the platform by the cabin of the elevator moving along a wall segment of a building comprises:

attaching the platform to the cabin by a first attachment means configured to be inserted into the hole of the top section of the cabin, moving the cabin together with the platform to a position where the platform is desired, attaching the platform to a wall segment by a second attachment means configured to rest on a support section of the flanges, and disconnecting the platform and the cabin, wherein the platform comprises an opening that allows the cabin to completely pass through the opening such that a range of motion of the cabin is not limited by a position of the platform;

wherein, when the cabin is disconnected from the platform, the platform is supported at a position within the building based on the second attachment means;

wherein, when the cabin is connected to the platform, the cabin and the platform are both supported within the building by a rope connected at one end to the cabin and at another end to an electric motor disposed at a top of the building;

wherein, when the cabin is located above the platform, the rope is above the platform, and when the cabin is located beneath the platform, the rope passes through the opening and extends beneath the platform.

* * * * *